F. P. TABER,
Assignor of two-thirds to J. A. Cook and C. W. Conklin.
APPARATUS FOR THE MANUFACTURE OF SUGAR, SALT, &c.
No. 10,501. Reissued July 22, 1884.
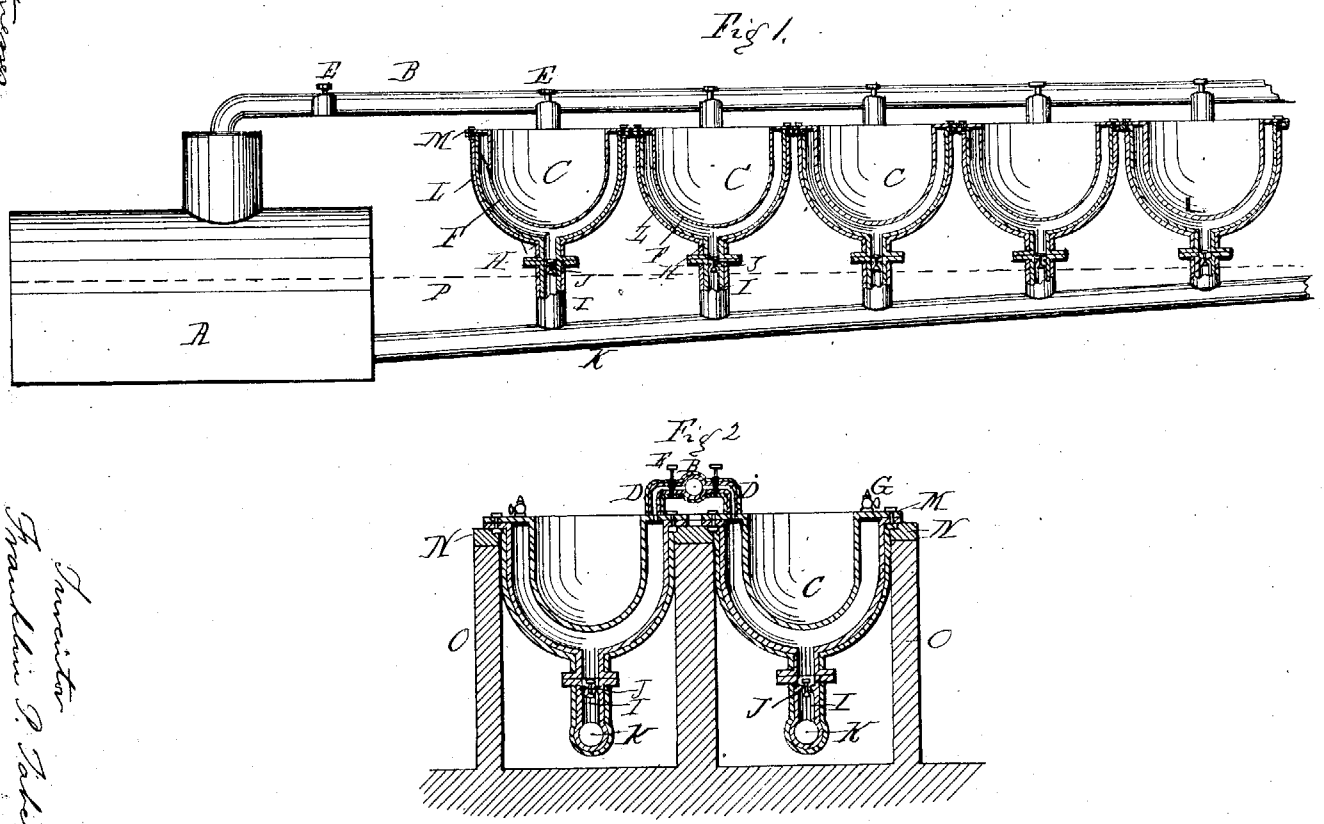
Witnesses
Jno R. Young
Warren C. Stone
Inventor
Franklin P. Taber
by Alex Mabon
Attorney

UNITED STATES PATENT OFFICE.

FRANKLIN P. TABER, OF AUBURN, NEW YORK, ASSIGNOR OF TWO-THIRDS TO JOSEPH A. COOK AND CALVIN W. CONKLIN, OF SAME PLACE.

APPARATUS FOR THE MANUFACTURE OF SUGAR, SALT, &c.

SPECIFICATION forming part of Reissued Letters Patent No. 10,501, dated July 22, 1884.

Original No. 268,956, dated November 28, 1882. Application for reissue filed October 1, 1883

*To all whom it may concern:*

Be it known that I, FRANKLIN P. TABER, of Auburn, in the county of Cayuga and State of New York, have invented new and useful Improvements in Apparatus for the Manufacture of Sugar, Salt, Soap, Varnish, and for the boiling and evaporation of any liquid or solution, of which the following, taken in connection with the accompanying drawings and the letters of reference marked thereon, is a full, clear, and exact description.

My invention relates to certain improvements in apparatus for the manufacture of sugar, salt, soap, varnish, and for the boiling or evaporation of any liquid or solution by means of steam; and it consists of one or more steam-jacketed kettles, and of a certain method or means of supplying them with steam from a steam boiler or generator, whereby any salt-water, cane-juice, soap, varnish, fatty matter, or solution placed in such kettles is first subjected to a uniform heat applied to the entire kettle; second, boiled; third, evaporated, and the water of condensation derived from the steam so applied to the kettles returned to the boiler or generator at or near boiling-point through or by means of a pipe or pipes connected with the lower extremity of the kettle or kettles, in such a manner that the steam introduced to the jacketed kettle or kettles is not in any way obstructed nor its heat neutralized by reason of being brought in contact with the water of condensation, thereby working a great saving in the fuel, labor, and time required for the boiling and evaporation of such brine, cane-juice, or solution, and by reason of the uniform boiling of the same admits of the result of the evaporation being brought to a much greater degree of purity, and prevents the collection of any impurities or incrustation on the sides of the interior jacketed kettle, together with a non-conducting substance applied to the outer surface of the exterior jacket of said kettle or kettles, and all pipes, laterals, and connections leading from and to the said boiler or generator and the said kettle or kettles, thereby preventing radiation from the surfaces so exposed, all of which said apparatus is hereinafter more fully described, and will be better understood by referring to the before-mentioned drawings.

Figure 1 is a longitudinal drawing of the apparatus, and is there shown so that any number of kettles in addition to those illustrated may be connected in like manner in the same series. Fig. 2 represents a cross-section of the apparatus on line *x x* in Fig. 1.

The same letters on different figures indicate like parts.

The letter A indicates an ordinary steam-boiler in common use as a steam-generator; B, the steam-supply pipe leading from and connected with the dome of the boiler on a line above and between the series of kettles C C, in the manner shown in Figs. 1 and 2, by means of which and its laterals D D, each of which is supplied with a steam compression or throttle valve, E E, and connected with the steam-space F F between the jackets of the several kettles by means of a screw-threaded hole made through the flange or rim of the inner kettles, the steam-space of each of said kettles is provided with an air-valve, G, inserted in a screw-threaded hole made through the rim or flange of the inner kettles at a point in such flange on the opposite side of the kettle to the point where steam is introduced to said steam-space, as shown in the drawings, and has for its office to permit the escape of air from the steam-space and allow the same to be filled with steam, also in opening H in the bottom of the outer kettle, and connected by means thereof and through the pipes I, each of which is supplied with the sliding check-valve J, with the return-pipe K, and through that with the boiler or generator A. Each of said kettles and the pipes and laterals running to and from said boiler and kettles are covered with a non-conducting substance, L L, and the whole apparatus so constructed that if the water-line of said boiler or generator P were extended to a point under the said kettles the bottom of each of said kettles shall be above the level of such water-line, by means of which elevation the water of condensation is caused to return to the boiler without the aid of a steam-trap or other device, and is there held by means of the sliding check-valve J, so that, if desired, any one or more of the combination of kettles so constructed may be cut out by means of the throttle-valves E I in the laterals D D without flooding the steam-space F F between the outer and inner kettles by reason of a back-pressure from the boiler or generator, thereby rendering the kettle more safe and always ready for use. The supply-pipes are so run and laid that all water of condensation forming in the supply-pipes B D D, the steam-space F F, and the return-pipes I I and K will of itself flow from the throttle E in the main supply-pipe B, through B to D D, to F F, to I I, to K, to the boiler, and the several kettles placed in position, as shown in Fig. 2, so that the flange M shall rest upon and be above the level of the floor N, which is in turn supported by the piers, walls, or posts O.

The operation of the apparatus is shown by placing in any one or more of the kettles any solution or liquid, as salt-water or brine. The boiler A being supplied with steam, the throttle E in the main supply-pipe B is opened, permitting steam to pass throughout the whole extent of said pipe. The air-valve G G is then opened to permit the escape of air from the steam-space F, when the throttles E E in the laterals D D are opened, permitting the escape of steam from B to F, forcing the air from F through G, which is closed on the appearance of the escape of steam therefrom. The apparatus is then in full operation. The heat from the steam thus introduced heats the inner kettle, and the heat is transmitted through the side of the kettle to the solution within, causing the same to boil and the liquid in the solution to evaporate, leaving the salt of the brine in the bottom of the kettle. The water of condensation resulting from the steam thus introduced is in the meantime passing out of the steam-space F through the opening H, through I, J, and K to the boiler at or near boiling-point. It will be observed that by introducing the steam at the top of the space between the outer and the inner kettle the greatest heat will be near the top of the kettle and at a point where most needed for the rapid evaporation of the fluids contained in the kettles, and, furthermore, the steam, in entering the space between the kettles, does not come in contact with the water of condensation, as is the case in most of the evaporators of this class.

Having thus described my invention, I claim—

1. The combination, with the boiler or generator, of the supply-pipe B, with its laterals D D and throttle-valves E E E, placed above and between the sets of kettles, and communicating through the flange or rim of the inner kettle with the steam-space between the kettles or kettles and jackets, substantially as described.

2. In combination with the boiler or generator, the supply B, with its laterals D D and cocks or throttles E E, the jacketed kettles C C, provided with the air-valve G, placed in the rim or flange of the inner kettles, substantially as described.

3. In combination with the boiler, supply-pipe B, with its laterals D D, throttles E E, and the jacketed kettles C C, with the air-valve G, the return-pipe K, connected with the boiler A, for the water of condensation, placed at or near the bottom of the kettles, and connected with the steam-space between the outer and inner kettles by means of the lateral pipes I I, substantially as set forth.

4. In combination with the boiler, supply-pipe B, with its laterals D D and throttles E E, the jacketed kettles C C, with the air-valve G, and the return-pipe K, with its lateral pipes I I, the sliding check-valve J J in the lateral pipes I I, for allowing the water of condensation to pass out of the steam-space F F and hold in check any back-pressure from the boiler, and thereby prevent the flooding of the steam-space between the kettles with the water from the boiler.

5. In combination with the boiler, supply-pipe B, with its connections, laterals D D, and throttles or cocks E E, the jacketed kettles C C, with the air-valve G, and the return-pipe K, with its lateral pipes I I, each supplied with the sliding check-valve J J, the non-conducting covering L L, for the respective pipes, kettles, and exposed heated surfaces of the apparatus.

6. The return-pipe provided with lateral pipes, which connect the said return-pipe with the steam-chamber between the inner and outer kettles, in combination with the check-valve, whereby the water of condensation is permitted to return to the boiler, while the back-pressure from the boiler is held in check, as set forth.

7. In an apparatus for evaporating liquids, the double-walled kettles provided with a steam-space, and devices, substantially as described, for admitting steam to the steam-space at the top thereof, and valved openings at the bottom or lowermost point of said steam-space to permit of the escape of the condensed steam, as set forth.

8. In an evaporating apparatus, the double-walled kettles provided with the steam-space inclining downward from the top or point of admission of the steam to the outlet or return pipe, in combination with the steam-supply pipe and the return-pipe, arranged substantially as described, whereby the steam, on being condensed, is caused to return immediately to the boiler and before being cooled, as set forth.

9. As an improvement in the art of evaporating liquids, a steam-supply pipe adapted to conduct the steam into the top of the steam-space between the walls of the kettles or kettle and jacket, and a return-pipe connected to the bottom of said steam-space, in the manner substantially as described, whereby the steam is continuously supplied to the kettles and the water of condensation continuously returned to the boiler below the water-line, as set forth.

FRANKLIN P. TABER.

Witnesses:
HORACE T. COOK,
GERRIT LOUGHBOROUGH.